(12) United States Patent  
Wu

(10) Patent No.: US 7,180,730 B2  
(45) Date of Patent: Feb. 20, 2007

(54) RETAINER DEVICE

(75) Inventor: Pin-Hsien Wu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 125 days.

(21) Appl. No.: 10/948,552

(22) Filed: Sep. 22, 2004

(65) Prior Publication Data

US 2005/0088807 A1    Apr. 28, 2005

(30) Foreign Application Priority Data

Oct. 24, 2003    (TW) .............................. 92218921 U

(51) Int. Cl.  
*G06F 1/16* (2006.01)
(52) U.S. Cl. ........................ 361/679; 361/683; 361/686
(58) Field of Classification Search ................ 361/679, 361/683, 685, 686  
See application file for complete search history.

(56) References Cited

U.S. PATENT DOCUMENTS 6,122,173 A * 9/2000 Felcman et al. ............ 361/726  
6,256,195 B1 7/2001 Liao  
6,590,775 B2 7/2003 Chen

* cited by examiner

*Primary Examiner*—Yean-Hsi Chang  
(74) *Attorney, Agent, or Firm*—Wei Te Chung

(57) ABSTRACT

A retainer device includes a bracket (40), a resilient member (60), and a fixing board (70). The bracket includes a pair of sidewalls (42) having a number of opening (421) for receiving shield plates (20). A block protrudes at one side of the opening. A front wall (44) and a middle wall (47) are disposed between the sidewalls. A hole (442, 47) is separately defined in front wall and the middle wall for the fixing board extending therethorugh. The fixing board comprises a number of fixing tabs and resilient tabs perpendicular to the fixing tabs for engaging with the shield plates. The fixing board is slideably held in the bracket by the resilient member to engagingly retaining the shield plates therein. A plurality of apertures is defined in the walls of the bracket for receiving screws.

15 Claims, 4 Drawing Sheets

RETAINER DEVICE

BACKGROUND OF THE INVENTION

1. Field of the Invention

The present invention relates to a retainer device, and in particular to a retainer device installed in an electronic device which can readily and conveniently retain accessorial parts thereof.

2. Description of the Related Art

A plurality of screws is often used in an electronic equipment to secure various elements therein. These elements achieve functions of the electronic equipment. Guiding rails are often attached to sidewalls of storage devices by means of screws, which is disclosed in U.S. Pat. No. 6,590,775. Then the storage devices are slidably installed in a computer case. Contemporary users sometimes need to install additional storage devices in the computer to extend memory capacity. Therefore, a number of screws and rails are required. Most vendors will provide a spare part bag containing screws, rails and I/O shield plates when the computer is delivered, but the bag is not always kept in the computer case. This lead inconvenience for the users may not obtain his needed spare parts in time.

Moreover, during the maintenance and repair of the computer, the screws, the rails and other accessorial parts are detached off. As there is not a certain place to kept the detached accessorial parts, lost will easily happen and cause troublesome to users.

Thus an improved retainer device installed in an electronic device overcomes the above-mentioned drawbacks is desired.

SUMMARY OF THE INVENTION

Accordingly, an object of the present invention is to provide a retainer device installed in an electronic device which can readily and conveniently store accessorial parts thereof.

To achieve the above-mentioned object, a retainer device of present invention includes a bracket, a resilient member, and a fixing board. The bracket includes a pair of sidewalls having a number of opening for receiving shield plates. A block protrudes at one side of the opening. A front wall and a middle wall are disposed between the sidewalls. A hole is separately defined in front wall and the middle wall for the fixing board extending therethorugh. The fixing board comprises a number of fixing tabs and resilient tabs perpendicular to the fixing tabs for engaging with the shield plates. The fixing board is slideably held in the bracket by the resilient member to engagingly retaining the shield plates therein. A plurality of apertures is defined in the walls of the bracket for receiving screws.

Other objects, advantages and novel features of the present invention will be drawn from the following detailed description of a preferred embodiment of the present invention with attached drawings, in which:

DETAILED DESCRIPTION OF THE INVENTION

Figure 1:
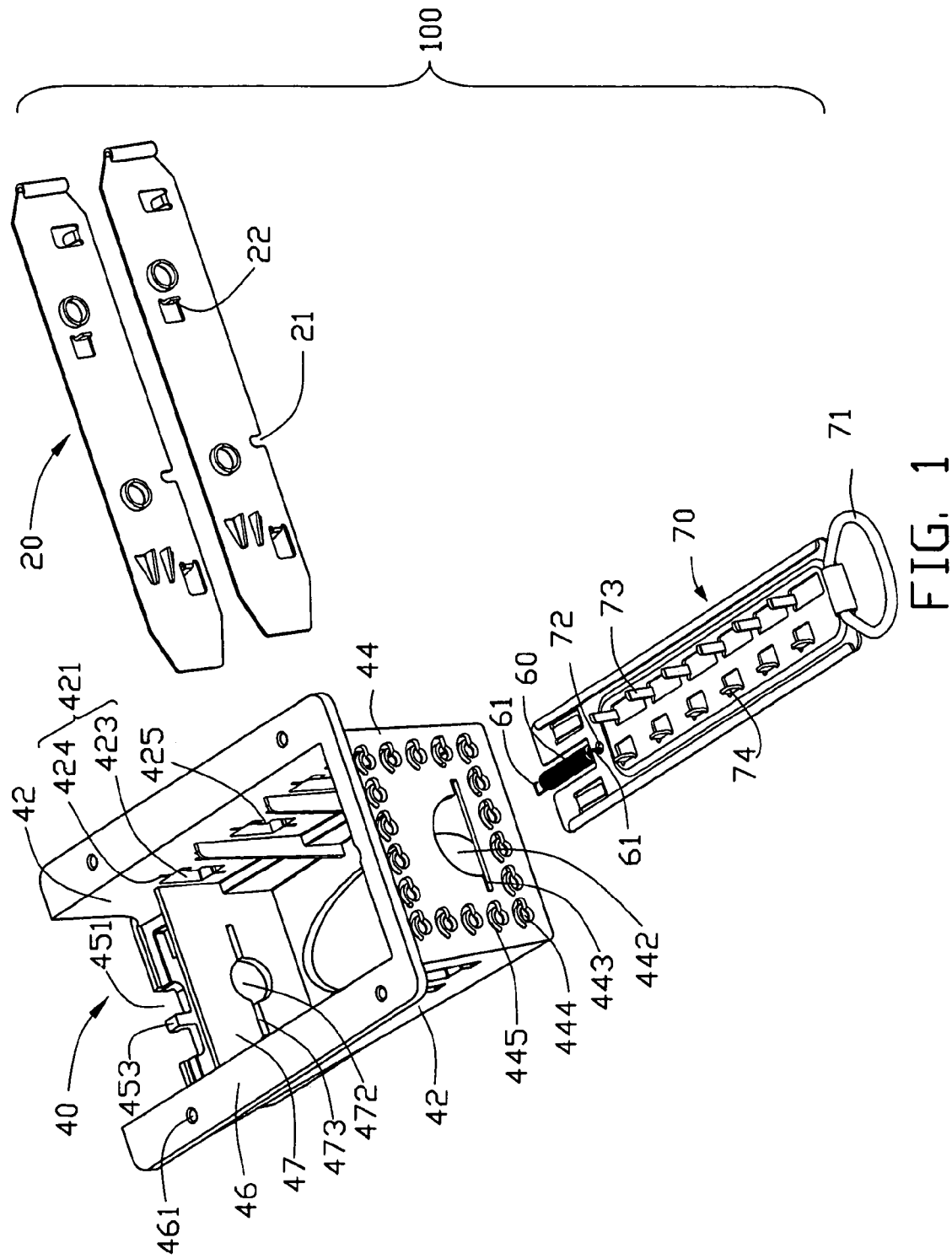
FIG. 1 is an exploded, isometric view of a retainer device of the present invention.
Figure 2:
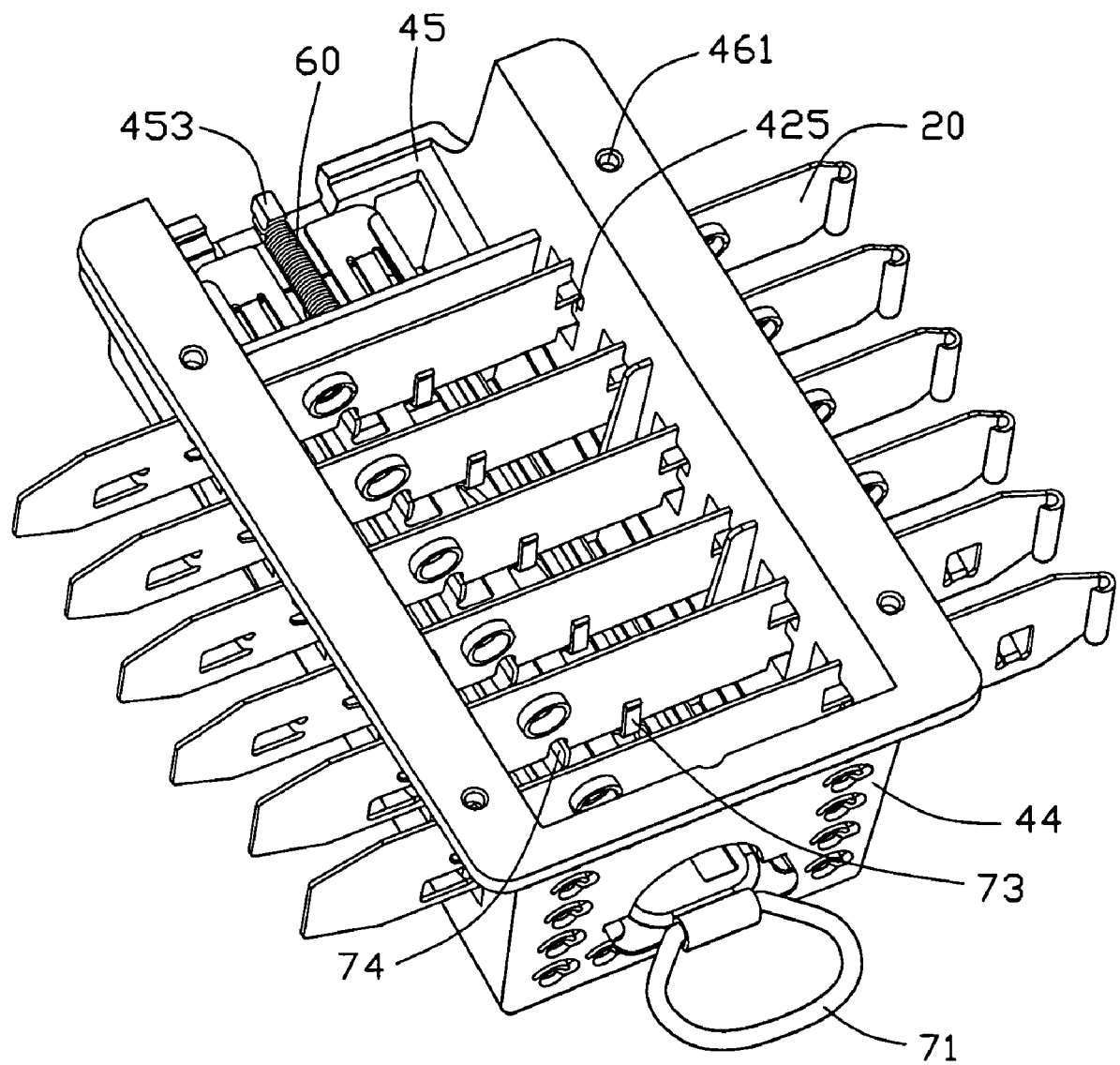
FIG. 2 is an assembled view of FIG. 1.
Figure 3:
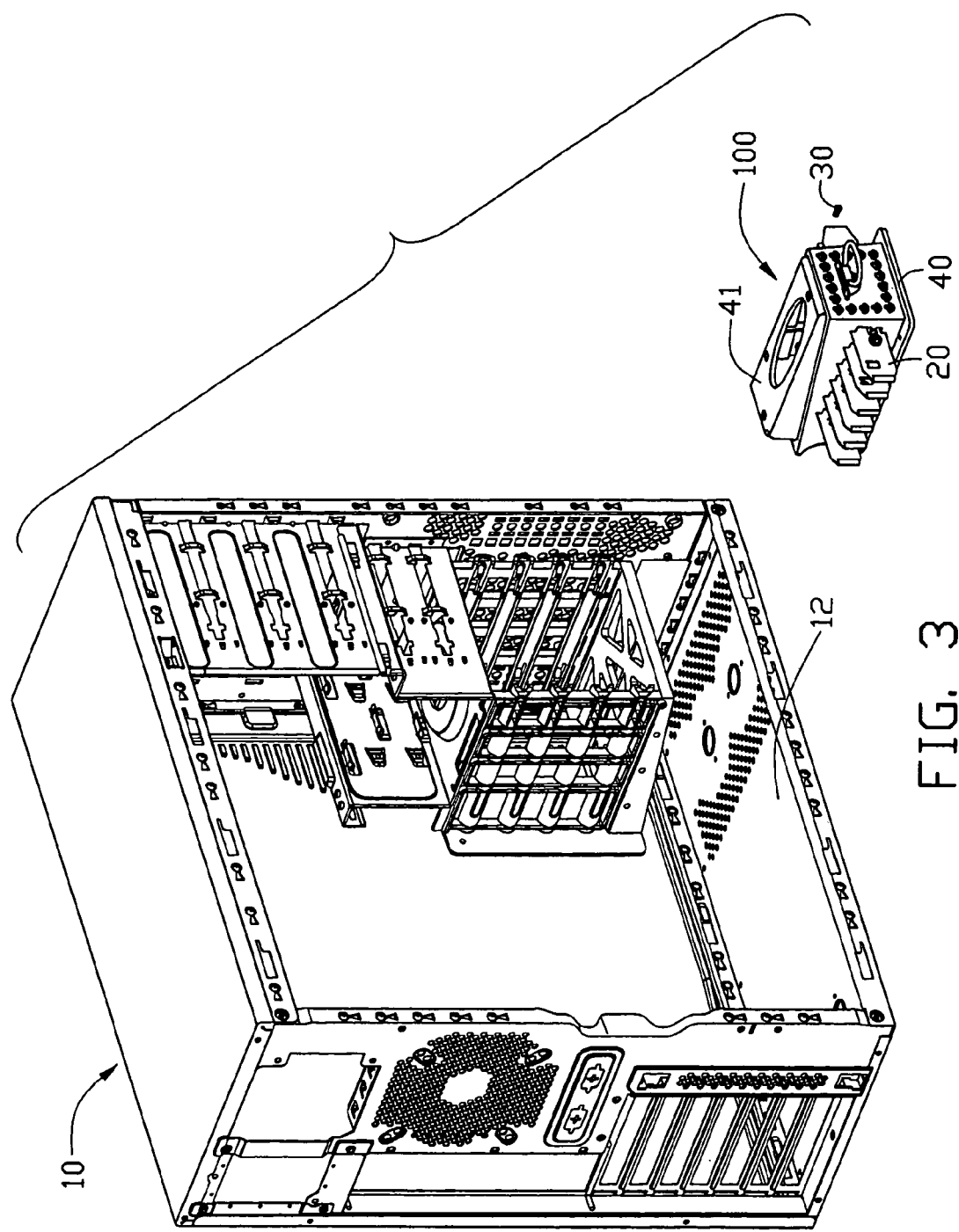
FIG. 3 is an isometric view of the retainer device of FIG. 1, together with a computer cage.
Figure 4:
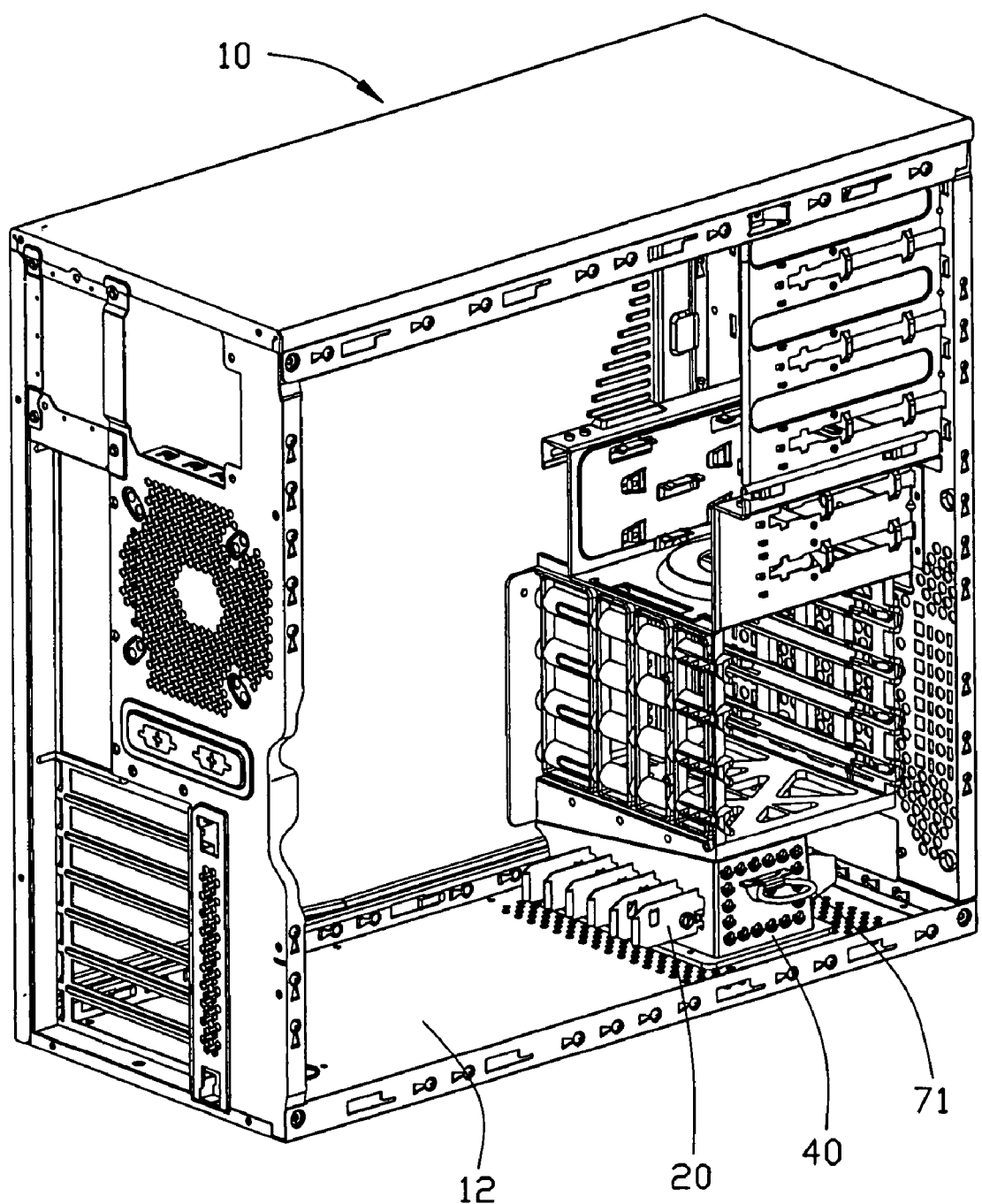
FIG. 4 is an assembled view of FIG. 3.

Referring to FIGS. 1 to 4, a retainer device 100 in accordance with the preferred embodiment of present invention is used to accommodate accessorial parts therein, such as screws, guiding rails, and I/O shielding plates, and so on. The retainer device 100 is to be installed in a computer case 10 for facilitating users to access the accessoral parts. In the preferred embodiment, the accessorial parts are screws 30 and I/O shield plates 20. The retainer device 100 comprises a bracket 40, a resilient member 60, and a fixing board 70.

The bracket 40 comprises a base wall 41 (see FIG. 3), a pair of parallel sidewalls 42, a front wall 44, and a rear wall 45, respectively extending from edges of the base wall 41. The front wall 44 and the rear wall 45 are formed at two ends of the base wall 41. A middle wall 47 is perpendicularly formed from a middle of the base wall 41, parallel to the rear wall 45 and the front wall 44. Flanges 46 are extended outwardly and horizontally from edges of the side walls 42 and the front wall 44. A plurality of fixing holes 461 is defined in the flange 46. A plurality of conventional fasteners (not shown) is extended through the fixing holes 461 to attach the bracket 40 to a bottom panel 12 of the electronic device 10.

A semicircular first hole 442 is defined in the middle of the front wall 44. The first hole 442 has a pair of slits 443 horizontally and radially extending from a bottom portion thereof. A plurality of apertures 444 is defined in the front wall 44 around the first hole 442, for engagingly receiving the screws 30. A generally spiral finger 445 is formed in each aperture 444, for providing resilient deformation and tightly holding the screw 30 therein. Optionally, the aperture 444 can be threaded. A circular second hole 472 is defined in the middle wall 47, corresponding to the first hole 442. The second hole 472 has a pair of slits 473 horizontally and radially extending from the second hole 472. A post 453 is formed in the rear wall 45, corresponding to centers of the first and second holes 442, 472. A pair of cutouts 451 is defined in the rear wall 45 besides the post 453.

A plurality of openings 421 is symmetrically defined in the sidewalls 42, for receiving the shielding plates 20 therein. Each opening 421 comprises a rectangular portion 423 and a vertical slim portion 424 extending from the rectangular portion 423. A block 425 protrudes from a side edge of the rectangular portion 423.

The fixing board 70 are configured to be attached to the bracket 40 via the first and second holes 442, 472. A plurality of resilient tabs 73 and fixing tabs 74 separately extend from the fixing board 70 along longitudinal sides thereof. The resilient tabs 73 are perpendicular to the fixing tabs 74. A handing ring 71 is attached to the front of the fixing board 70, and a securing hole 72 is defined in the rear of the fixing board 70.

The resilient member 60 is preferably a coil spring. The resilient member 60 comprises a hook 61 at each opposite end, for respectively engaging with the post 453 of the bracket 40 and the securing hole 72 of the fixing board 70.

The shielding plates 20 comprises a blocking tab 22 extending outwardly therefrom and a notch 21 defined in a bottom edge thereof. The blocking tab 22 is for engaging with the block 425 of the bracket 40. The notch 21 is for engagingly receiving the fixing tabs 74 of the fixing board 70.

In assembly of the retainer device 100, the fixing board 70 is inserted into the bracket 40 from the first hole 442 of the front wall 44 and extended through the second hole 472 of the middle wall 47. The hooks 61 of the resilient member 60 separately engage with the post 453 and the securing hole 72 to slideably and elastically attach the fixing board 70 to the bracket 40. A plurality of fasteners (not shown) is extended through the fixing holes 461 to secure the retainer device 100 to the bottom panel 12 of the electronic device 10.

In use, the shielding plates 20 is ready to be retained in the retainer device 100. The fixing board 70 is drawn outwardly with a pull force applied to the handle ring 71 and the resilient member 60 is elongated. The shielding plates 20 are inserted into the bracket 40 along the vertical slim portions 424 of the opening 421. When the blocking tabs 22 of the shielding plates 20 contact the blocks 425 of the bracket 40, the fixing board 70 is released gradually and the resilient member 60 rebounds. With the fixing tabs 74 of the fixing board 70 engaging in the notches 21 of the plate 20, and the resilient tabs 73 resiliently abutting against side surfaces of the plates 20, the shielding plates 20 are securely retained in the bracket 40. With the similar foresaid operations, the shielding plates 20 are detached from the retainer device 100. The fixing board 70 is drawn outwardly to withdraw the resilient tabs 73, and the fixing tabs 74 from the notches 21 and the side surfaces of the plates 20. The plates 20 are dragged outwardly along the vertical slim portion 424 of the opening 421 of the bracket 40.

Some screws 30 are tightly held in the aperture 444 of the bracket 40.

It is to be understood, however, that even though numerous characteristics and advantages of the present invention have been set forth in the foregoing description, together with detail members of the structure and function of the invention, the disclosure is illustrative only, and changes may be made in detail member, especially in matters of shape, size, and arrangement of parts within the principles of the invention to full extent indicated by the broad general meaning of the terms in which the appended claims are expressed.

What is claimed is:

1. A retainer device adapted to be installed in an electronic device for retaining accessorial parts, the retainer device comprising:
    a bracket adapted to be secured in the electronic device;
    a fixing board movably attached to the bracket in a front-to-back direction, the fixing board comprising a plurality of fixing tabs extending therefrom;
    a plurality of accessorial parts each defining a notch; wherein
    when the fixing board is moved to a first position, the accessorial parts are placed in the bracket in a direction perpendicular to the fixing board with the notches in alignment with the fixing tabs; and wherein
    when the fixing board is moved to a second position, the fixing tabs of the fixing board engage in the notches of the accessorial parts, thereby securing the accessorial parts into the bracket.

2. The retainer device as described in claim 1, wherein the bracket comprises a base wall, a pair of sidewalls, a front wall, and a rear wall, a post is formed in the rear wall.

3. The retainer device as described in claim 2, wherein the fixing board comprises a handle ring and a securing hole at opposite ends thereof.

4. The retainer device as described in claim 3, wherein a resilient member connects the fixing board to the rear wall of the bracket with hooks thereof separately engaging with the post and the securing hole.

5. The retainer device as described in claim 2, wherein a middle wall parallel to the front wall is formed in the bracket, a first hole is defined in the front wall, a second hole is correspondingly defined in the middle wall, for the fixing board extending therethrough.

6. The retainer device as described in claim 2, wherein a plurality of apertures is defined in the front wall, for receiving screws therein.

7. The retainer device as described in claim 6, wherein a curved finger is fanned in each of the apertures for providing resilient deformation and tightly holding the screws.

8. The retainer device as described in claim 2, wherein a plurality of openings is symmetrically defined in the sidewalls, for receiving the accessorial pans.

9. The retainer device as described in claim 8, wherein a block protrudes from a side edge of the opening.

10. The retainer device as described in claim 1, wherein the fixing board further comprises a plurality of resilient tabs perpendicular to the fixing tabs, for abutting against the accessorial parts.

11. A retainer device assembly for retaining accessorial parts, the accessorial parts comprising a plurality of screws and plates, the retaining device comprising:
    an electronic device;
    a retainer device installed in the electronic device, the retainer device comprising a bracket, a resilient member, and a fixing hoard, the bracket comprising a pair of sidewalls defining a plurality of openings therein, a pair of end walls and a middle wall disposed between the sidewalls, two holes defined in one of the end walls and the middle wall, the fixing board extending through the holes and slidably attached to bracket via the resilient member, the fixing member comprising a plurality of fixing tabs, a plurality of apertures defined in the walls of the bracket for accommodating the screws;
    wherein the plates extend through the openings of the bracket and engage wit the fixing tabs of the fixing board.

12. The retainer device assembly as described in claim 11, wherein two flanges extend from edges of the sidewalls and the end walls, a plurality of fixing holes is defined in the flanges.

13. The retainer device assembly as described in claim 11, wherein each of the plates comprises a notch engaging with a corresponding fixing tab of the fixing board.

14. The retainer device assembly as described in claim 11, wherein the fixing board further comprises a plurality of resilient tabs perpendicular to the fixing tabs, for engagingly abutting against a corresponding plate.

15. The retainer device assembly as described in claim 11, wherein each of the plates comprises a blocking tab, a block protrudes from a side edge of opening of the bracket blacking the blocking tab.

* * * * *